US011218671B1

United States Patent
Bikumandla et al.

(10) Patent No.: US 11,218,671 B1
(45) Date of Patent: Jan. 4, 2022

(54) MONOCHROME CAMERAS WITH SPARSELY ARRANGED CLUSTERS OF COLOR FILTERS FOR COLORATION OF CONTENT

(71) Applicant: Facebook Technologies, LLC, Menlo Park, CA (US)

(72) Inventors: Manoj Bikumandla, Union City, CA (US); Andrew Matthew Bardagjy, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 57 days.

(21) Appl. No.: 16/682,217

(22) Filed: Nov. 13, 2019

(51) Int. Cl.
*H04N 9/097* (2006.01)
*H04N 5/265* (2006.01)
*H04N 9/43* (2006.01)
*G06T 7/593* (2017.01)
*H04N 5/247* (2006.01)
*G06T 7/292* (2017.01)
*H04N 9/04* (2006.01)
*G06K 9/46* (2006.01)

(52) U.S. Cl.
CPC .......... *H04N 9/097* (2013.01); *G06K 9/4652* (2013.01); *G06T 7/292* (2017.01); *G06T 7/593* (2017.01); *H04N 5/247* (2013.01); *H04N 5/265* (2013.01); *H04N 9/0455* (2018.08); *H04N 9/43* (2013.01)

(58) Field of Classification Search
None
See application file for complete search history.

(56) References Cited

U.S. PATENT DOCUMENTS

| 2016/0309134 A1* | 10/2016 | Venkataraman | G02B 27/017 |
| 2018/0288340 A1* | 10/2018 | Gillet | G01J 3/14 |
| 2019/0212261 A1* | 7/2019 | Lannestedt | G01J 3/0208 |
| 2019/0253593 A1* | 8/2019 | Li | G06T 5/50 |

OTHER PUBLICATIONS

"Techinsights: Apple Increases Number of PDAF Pixels in New iPhones," Image Sensors World [Online], Sep. 25, 2018 [Retrieved Feb. 7, 2020], 8 pages, Retrieved from the internet: URL: http://image-sensors-world.blogspot.com/2018/09/techinsights-apple-increases-number-of.html.

* cited by examiner

*Primary Examiner* — James M Anderson, II
(74) *Attorney, Agent, or Firm* — Fenwick & West LLP

(57) ABSTRACT

An imaging system comprises two cameras and a processor. A first camera comprises a first grid of pixels configured to detect light in a broadband channel and a plurality of clusters of color filters sparsely arranged over the first grid of pixels. Each color filter passes light in a color channel to the grid of pixels. A second camera comprises a second grid of pixels configured to detect light in a broadband channel. The processor is configured to generate an aggregate image by combining a first image captured by the first camera and a second image captured by the second camera. The processor is also configured to add color values to the aggregate image based on color data captured by the first camera with the clusters of color filters. Additionally, the processor is configured to present the aggregate image with added color values on an electronic display.

20 Claims, 5 Drawing Sheets

300

Capture a first image with a first camera and a second image with a second camera
310

Generate an aggregate image combining the first image captured by a first camera and the second image captured by the second camera
320

Add color values to the aggregate image based on color data captured by the first camera with the first plurality of clusters of color filters
330

Present the aggregate image with added color values on an electronic display of the HMD
340

FIG. 3

MONOCHROME CAMERAS WITH SPARSELY ARRANGED CLUSTERS OF COLOR FILTERS FOR COLORATION OF CONTENT

FIELD OF THE INVENTION

This disclosure relates generally to artificial reality systems, and more specifically to generating augmented reality for artificial reality systems.

BACKGROUND

Artificial reality systems that present mixed reality content typically include one or more color cameras used to capture color image data of a real-world environment. The system augments the color image data with virtual content of some sort. Conventional artificial reality headsets may include a plurality of color cameras (e.g., to determine depth and/or color information). However, color cameras are relatively complex, can be expensive, and power hungry.

SUMMARY

An imaging system comprises two cameras and a controller. A first camera comprises a first grid of broadband pixels configured to detect light in a broadband channel and a plurality of clusters of color filters sparsely arranged over the first grid of pixels. Each color filter passes light in a color channel to the grid of pixels. A second camera comprises a second grid of broadband pixels configured to detect light in a broadband channel. The controller is configured to generate an aggregate image by combining a first image captured by the first camera and a second image captured by the second camera. The controller is also configured to add color values to the aggregate image based on color data captured by the first camera with the clusters of color filters. Additionally, the controller is configured to present the aggregate image with added color values on an electronic display.

Disclosed is also a method for generating augmented reality content. The method includes generating an aggregate image by combining a first image captured by a first camera and a second image captured by a second camera. The method includes adding color values to the aggregate image based on color data captured by the first camera with a first plurality of clusters of color filters. The method also includes presenting the aggregate image with added color values on an electronic display. Also disclosed is a non-transitory computer-readable storage medium storing instructions for performing the method.

BRIEF DESCRIPTION OF THE DRAWINGS

FIG. 3 is a flowchart illustrating a process for generating augmented reality content, in accordance with one or more embodiments.

Figure 1A:
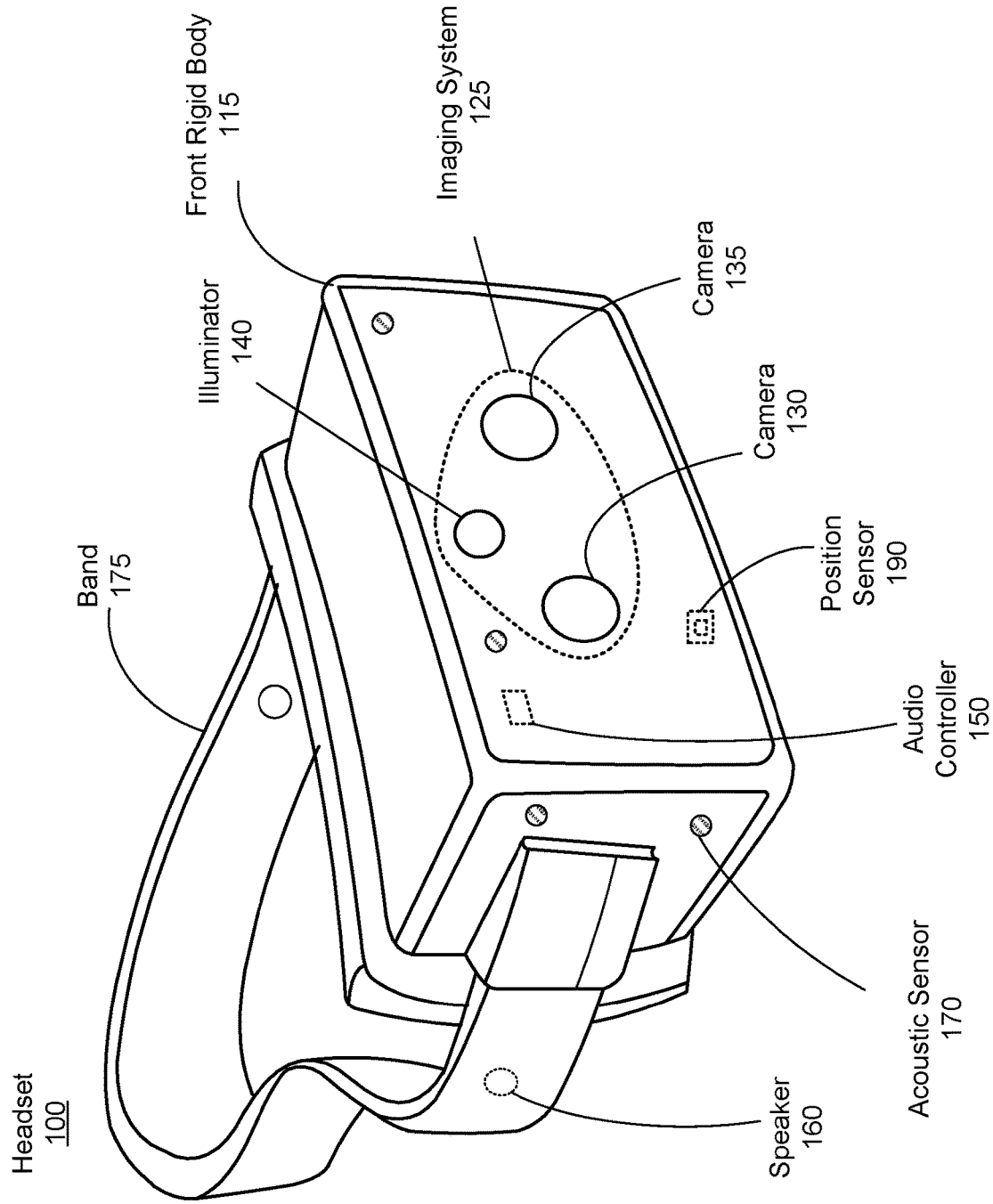
FIG. 1A is a perspective view of a headset implemented as a head-mounted display, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An imaging system (e.g., implemented in a headset) captures images of a local area. The imaging system includes at least two monochrome cameras and a processor. At least one of the cameras further comprises a plurality of clusters of color filters sparsely arranged over the camera sensor, wherein the camera is configured to capture color data with the plurality of clusters of color filters. The imaging system determines depth information of the local area with the captured images. The imaging system may determine a stereo correspondence between image pairs taken from the at least two cameras. The controller may use the stereo correspondence to calculate depth information for one or more surfaces in the local area, e.g., with epipolar geometry. The controller may further track one or more objects in the local area using the captured images.

Moreover, the imaging system presents image data relating to the local area on an electronic display based on the captured images. The controller generates an aggregate image combining images captured by the at least two monochrome cameras. In some embodiments, generating the aggregate image is based on the determined stereo correspondences between images captured by the cameras. The controller colors the aggregate image with color data captured by at least one camera with a sparsely arranged clusters of color filters, e.g., adding color values to the aggregate image. Each camera with sparsely arranged clusters of color filters captures color data at pixels covered by the clusters of color filters. One embodiment of adding color identifies objects in the aggregate image and a color pixel coincident with the identified object from the captured color data. The controller adds color values to remaining pixels of the identified object based on the pixel value of identified color pixel. Typically objects are generally uniform in color, such that identifying at least one color pixel allows the controller to color the object according to the identified color pixel. Other embodiments utilize machine learning models to color the aggregate image. The processor may further augment the colored image with other virtual content.

The monochrome cameras capture images in a broadband channel. Each camera comprises at least a camera sensor configured to detect light but may also include any optical element for focusing the light and such. The camera sensor comprises a grid of broadband pixels configured to detect light in a broadband light channel. The broadband light channel may encompass color light channels and may also encompass an infrared light channel. A light channel refers to a range of light wavelengths, wherein a color channel refers to a range of wavelengths in the visible spectrum of light and an infrared channel refers to a range of wavelengths in the infrared spectrum of light. As an example, a blue color light channel (or blue color channel) refers to light with wavelength in the range of 380 nm-500 nm. At least one of the cameras further comprises a plurality of clusters of color filters sparsely arranged over the camera sensor. A cluster of color filters comprise one or more color filters. Each color filter filters light thereby allowing a color light channel to pass through, e.g., to be detected by the camera sensor.

The imaging system is more cost effective, provides potential to decrease form factor compared to other systems, and reduces power consumption. Implementing monochrome cameras is cheaper and saves on power consumption compared to implementing color cameras. Moreover, some other systems include cameras designated for depth estimation and other cameras designated for capturing image data (e.g., color image data) to be presented on the electronic display, i.e., segregated functionality. The imaging system of this present disclosure can achieve depth estimation and capturing color image data for presentation on the electronic display with cross-functional monochrome cameras with at least one camera having sparsely arranged clusters of color filters for capturing color data. This cross-functionality optimizes camera use which allows for minimization of a number of cameras implemented on a headset, which yields minimization of form factor, costs, and power consumption.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1 is a perspective view of a headset 100 implemented as a head-mounted display, in accordance with one or more embodiments. In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes at least a display system (not shown) for providing visual content and an imaging system 125 including cameras 130 and 135 for capturing images of a local area around the headset 100. The headset 100 may further include an audio system for providing audio content. In particular and as shown in FIG. 1, the headset 100 includes a front rigid body 115, the imaging system 125 including the cameras 130 and 135 and an illuminator 140, an audio controller 150, a plurality of speakers 160, a band 175, a plurality of acoustic sensors 170, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The front rigid body 115 holds one or more of the components of the headset 100. The front rigid body 115 couples to a user's face around the user's eyes. The front rigid body 115 has a front side that is an exterior surface of the front rigid body 115 directed away from the user's body when the headset 100 is worn. The front rigid body 115 holds within the display system, such that the display system can provide visual content to the user's eyes. The front rigid body 115 may also the hold imaging system 125 comprising the cameras 130 and 135 and the illuminator 140, the audio system comprising the audio controller 150, the speakers 160, and the acoustic sensors 170. In FIG. 1, the front rigid body 115 holds the audio controller 150 and the acoustic sensors 170 while the speakers 160 is placed on the band 175. Moreover, the position sensor 190 may be placed on the front rigid body 115. The front rigid body 115 is attached to the band 175 which can be used to hold the front rigid body 115 to the user's face when the headset 100 is being worn by the user. The band 175 can be constructed by an elastic material providing sufficient force to hold the front rigid body 115 to the user's face.

The imaging system 125 capture images of a local area of the headset 100. The imaging system 125 includes the cameras 130 and 135 and the controller. In additional embodiments, the imaging system 125 further includes the illuminator 140. The plurality of cameras may be placed anywhere on the front rigid body 115, e.g., on an exterior oriented towards a local area of the headset, on an interior surface oriented towards a user's eyes, etc. In the embodiment shown in FIG. 1, cameras 130 and 135 are oriented on the exterior of the front rigid body 115 facing forward or towards the local area in front of the headset. The cameras 130 and 135 are placed on a substantially similar plane with fields of view that overlap in part, e.g., at least a pair of cameras have an overlapping fields of view. In some implementations, the cameras 130 and 135 may have almost complete overlapping fields of view. In other embodiments, the imaging system 125 may include additional cameras located anywhere around the front rigid body 115, e.g., for capturing images all around the headset 100. The controller is configured to process the captured image data from the cameras 130 and 135, e.g., for depth estimation and/or generating augmented reality content. The controller may comprise one or more computer processors for performing one or more operations when executing computer-readable instructions.

The cameras 130 and 135 capture images with some pixels in a broadband light channel and other pixels in one or more color light channels. Each camera comprises at least a camera sensor configured to detect light but may also include any optical element for focusing the light and such. The camera sensor comprises a grid of pixels configured to detect light in a broadband light channel. One or both of the cameras 130 and 135 comprise a plurality of clusters of color filters sparsely arranged over the camera sensor which allow for capturing of color data. Each color filter filters light thereby allowing light in a single color channel to pass through, e.g., to be detected by the camera sensor. This results in the pixels covered by a color filter to detect light only in the color channel of the color filter, such that the pixel data at those pixels also correspond to the color channel of the color filter. A cluster of color filters comprise one or more color filters (which may be of different color channels). In some embodiments, the camera sensor provides image data comprising intensity values at each pixel of light detected in one or more of the light channels. The camera components and operation is further described in FIG. 2.

The imaging system 125 determines depth information for one or more surfaces in a local area surrounding the headset 100 based on captured image data. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the cameras 130 and 135 capture images of the portion of the local area illumined by light emitted from the illuminator 140. The imaging system 125 controller computes depth information for the one or more surfaces in the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The depth information describes distances of one or more surfaces in the local area from the imaging system 125. More specifically, the distances may be defined from the one or more surface to the cameras 130 and 135 or some point between the cameras 130 and 135. The depth information may be a depth map wherein each pixel of the depth map describes a relative distance of the surface or may be a disparity map wherein each pixel of the disparity map describes a relative shift between a stereoscopic image pair (effectively an inverse of depth). A stereoscopic image pair refers to two images taken at the same time from two different perspectives with some overlapping field of view. Meanwhile, a stereo correspondence refers to a correlation between pixels in one image to pixels of the other image in the stereoscopic image pair, generally defined as a mathematical transformation between the two perspectives. The imaging system 125 may employ any number of stereo analyses to determine stereo correspondences between stereoscopic image pairs captured by the cameras 130 and 135. The stereo correspondence are determined based on at least the positions of the cameras 130 and 135, but potentially also the intrinsic parameters of the cameras 130 and 135. With the determined stereo correspondence between a stereoscopic image pair, the imaging system 125 can determine depth information of surfaces in the local area, e.g., using epipolar geometry. In epipolar geometry, the imaging system 125 may employ geometric calculations to determine depth of a surface by calculating disparity between corresponding pixels in the stereo correspondence, also factoring in intrinsic parameters of the cameras 130 and 135 such as optical center and focal length. In some embodiments, the imaging system 125 may implement a trained machine learning model to determine the depth information, wherein the stereoscopic image pair is input into the machine learning model and a depth map or a disparity map is output.

In some embodiments, the imaging system 125 may use the illuminator 140 to illumine the local area for depth estimation. The illuminator 140 emits light that illumines the local area which is captured by the cameras 130 and 135. In one or more embodiments, the illuminator 140 emits an infrared flash that is captured by the cameras 130 and 135, wherein a time-of-flight calculation (ToF) is used to calculate distances of objects. In other embodiments, the illuminator 140 emits a structured illumination pattern which aids in determining the stereo correspondence between stereoscopic image pairs. For example, the structured illumination pattern is a grid-like pattern with rows and columns of infrared light. As there are a finite number of intersections of the rows and columns, the imaging system 125 may identify the location of each intersection in different images taken from different perspectives thereby aiding in determining the stereo correspondence.

In additional embodiments, the imaging system 125 may track one or more objects in the local area with the captured images. The imaging system 125 may identify one or more objects in the local area from an image captured by one of the cameras 130 and 135. Identifying objects may be accomplished by, for example, applying one or more image kernels to identify outlines by which objects may be determined. The imaging system 125 may identify the same object in another image (e.g., taken by the same camera as the initial image) at another time (e.g., a later timestamp) and calculate a displacement of the object by calculating a disparity in position of the object between the first image and the second image. The imaging system 125 may also consider depth information at different points in time in calculating the displacement of the object.

Additionally, the imaging system 125 augments the image data in some manner to generate augmented reality content. In one manner of augmenting the image data, the imaging system 125 colors images captured by the cameras 130 and 135 for presentation via the display system. If the image data is presented with pixels substantially in the broadband, the perception of reality would be lacking, such that coloration of the image data would improve the realism. The controller generates an aggregate image combining images captured by the cameras 130 and 135. The controller augments the image data with color data captured by color pixels of the camera sensor covered by the clusters of color filters. As mentioned above, the images captured by the cameras 130 and 135 comprise some pixels in a broadband channel and other pixels in one or more color channels. The controller adds color values to pixels of the aggregate image in the broadband channel. The colored image may be presented, e.g., via the display system. Other manners of augmenting the image data include but are not limited to adding other virtual content, adjusting color values, distorting the image, other transformations, other augmentations, etc.

In a first manner of augmenting the visual content, the imaging system 125 colors image data captured of a local area by the cameras 130 and 135. The imaging system 125 may seek to present, via the display system, a color view of the local area that is in view of the cameras 130 and 135 of the headset 100, thus simulating the user's environment. To generate the color view of the local area, the imaging system 125 may aggregate a stereoscopic image pair captured by the cameras 130 and 135 to create an aggregate image of a larger dimension than a single image from the stereoscopic image pair. To generate the aggregate image, the imaging system 125 may use a determined stereo correspondence between a stereoscopic image pair to construct the aggregate image by placing image data from both images of the stereoscopic image pair in positions of the aggregate image constrained by the stereo correspondence. The resulting aggregate image may be of a larger dimension than a single image from the stereoscopic image pair e.g., such that the aggregate image may substantially fill the electronic display of the display system. The generated aggregate image comprises pixels in the broadband channel with some pixels in one or more color channels given the stereoscopic image pair also having pixels in the broadband and in one or more color channels.

The imaging system 125 adds color values to the aggregate image with the color data captured by at least one of the cameras 130 and 135 with the clusters of color filters. The color data may include a sparse number of pixels with a color value, e.g., red, green, blue, magenta, cyan, yellow, or black, etc. The imaging system 125 may use the color data to add color values to one or more other pixels in the aggregate image.

In some embodiments of coloration, the imaging system 125 identifies objects in the aggregate image and adds color to pixels corresponding to the objects based on the color data. As the user cannot physically see the local area, the user does not have a baseline for realistic coloration of the local area. Taking advantage of this lack of baseline, the imaging system 125 uses the sparse color data to color objects. The imaging system 125 may identify objects in a variety of ways. In one implementation, the imaging system 125 determines outlines for objects in the aggregate image, e.g., by applying one or more kernels to the aggregate image, from the outlines the objects may be identified. Other implementations have the imaging system 125 incorporating other data such as the stereo correspondence and/or the depth information to identify the objects. The imaging system 125 may identify a color pixel in the color data coincident with an identified object and may add color values to substantially all other pixels corresponding to the identified object. In a rudimentary example, the imaging system 125 may add the same color value to all pixels corresponding to the identified object, uniformly coloring the identified object. In additional implementations, the imaging system 125 may add color values that depend also on the broadband value of the pixels being colored. This can result in maintaining features such as shading of objects, outlines of objects, textures of objects, other features of objects, etc., thereby increasing a degree of realism to the object with added color values.

In one or more embodiments, the imaging system 125 applies a trained machine learning model to add color values to one or more pixels of the aggregate image. The trained machine learning model may be trained with a number of training images of the world captured by one or more cameras. Upon sufficient training, the trained machine learning model may input the aggregate image with the color data and add color values to the pixels without color values. Different machine learning techniques may be implemented such as a support vector machine (SVM), boosting for other algorithms (e.g., AdaBoost), neural networks, logistic regression, naïve Bayes, memory-based learning, random forests, bagged trees, decision trees, boosted trees, or boosted stumps.

In another manner of augmenting the image data, the imaging system 125 may additionally augment the aggregate image of the local area with generated virtual objects. The imaging system 125 may generate virtual objects according to content from an application executed by the imaging system 125. The imaging system 125 may generate the virtual objects further considering identified objects and/or depth information determined by the imaging system 125, e.g., to place the virtual objects in synchronicity with other objects in the local area. For example, a virtual character is placed in the aggregate image. To improve realism of the virtual character, the imaging system 125 generates the virtual character to be interactive with the local area. This may result in adjusting a size of the virtual character as the virtual character moves closer to or farther from the point of view of the aggregate image. Other examples include occluding and disoccluding the virtual character as the virtual character move in front of or behind identified objects in the aggregate image. Another benefit of the cross-functionality of the imaging system 125 is a match between the depth estimation (and/or tracking) and the coloration of the scene. In conventional systems, there is a mismatch between the global view (e.g., from a perspective of a central color camera) and the local view(s) (e.g., from perspective(s) of the tracking monochrome camera(s)). With this match, the imaging system 125 can accurately place generated virtual content.

The imaging system 125 provides the image data, e.g., via a display system of the headset 100. In embodiments with augmented image data, the image data provided to the display system may include the aggregate image with added color values. In presenting the aggregate image of the local area with the added color values, the imaging system 125 may simulate an eyewear device that allows light from the environment through to the user's eyes. Other embodiments of augmented image data include added virtual content.

In some embodiments, the imaging system 125 may provide for simultaneous localization and mapping (SLAM) for a position of the headset 100 and updating of a model of the local area. For example, the imaging system 125 may color the captured images by the cameras 130 and 135. The colored images and/or the depth information may be used to determine parameters of the local area, generate a model of the local area, update a model of the local area, or some combination thereof. Furthermore, the position sensor 190 tracks the position (e.g., location and pose) of the headset 100 within the room, which is used when modeling the local area.

The imaging system 125 may further generate a local model of the environment that stores identified objects (or other descriptors of the scene) and any color information that has been sampled that coincide with the identified objects. The imaging system 125 may continuously update the local model as more color data is captured and/or more color is added to the scene. The local model improves simultaneous colorization of the scene and tracking. At startup of the imaging system 125 (or more generally a headset 100), there is some transition time as the imaging system 125 sparsely samples color data, e.g., a few hundred frames of capture corresponding to 10 ms of time with a refresh rate of 90-120 Hz. Or we could potentially run the selected ROI pixels and update the color map at a faster rate than the native gray scale map (a more advanced implementation).

The imaging system 125 proves advantageous over conventional systems. Traditionally, imaging systems would include at least three cameras designated for separate functions. This includes at least two monochrome cameras suited for use in depth estimation or tracking of objects. There is, additionally, a third color camera suited for capturing color data to color the local area captured by any of the cameras. Functionality-wise, the two monochrome cameras cannot detect any color data but they yield a higher signal-to-noise ratio compared to color cameras. This higher signal-to-noise ratio allows for better determination of stereo correspondence, resulting in better depth estimation and tracking. However, lack of color data creates the necessity for the third color camera if color image data of the local area is sought to be provided to the user. Alternatively, implementing two color cameras is generally more costly than implementing two monochrome cameras with sparsely arranged clusters of color filters. The benefit of using the two monochrome cameras with sparsely arranged clusters of color filters boils down to cost efficiency and power efficiency whilst maintaining functionality that would otherwise not be available in color cameras.

The display system (not shown) provides visual content. The display system has, among other components, an electronic display and an optics block. The electronic display generates image light according to visual content rendered to be presented to the user. The optics block directs the image light to an eye-box of the headset 100 where a user's eyes would be located when the headset 100 is properly worn. The eye-box is a location in space that an eye of user occupies while wearing the headset 100. For example, the display system may be implemented as a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye-box of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. The display system may additional comprise other optical elements for various purposes, e.g., focusing of light, correcting for aberrations and/or distortions, magnifying light, directing light from an environment, etc. The display system will be discussed in greater detail in FIG. 7.

The audio system provides audio content. The audio system includes the audio controller 150, the speakers 160, and the acoustic sensors 170. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The speakers 160 present sound to a user. The speakers 160 include a plurality of transducers. A transducer is a device that generates vibrations detectable by a cochlea in a user's ears. Although the speakers 160 are shown on the band 175 in FIG. 1, the speakers 160 may be alternatively or additionally placed on the front rigid body 115. In some embodiments, instead of individual speakers for each ear, the headset 100 includes a speaker array comprising multiple speakers integrated into the front rigid body 115 to improve directionality of presented audio content. The number and/or locations of speakers 160 may be different from what is shown in FIG. 1.

The acoustic sensors 170 detect sounds within the local area of the headset 100. An acoustic sensor 170 captures sounds emitted from one or more sound sources in the local area (e.g., a room). Each acoustic sensor is configured to detect sound and convert the detected sound into an electronic format (analog or digital). The acoustic sensors 170 may be acoustic wave sensors, microphones, sound transducers, or similar sensors that are suitable for detecting sounds. The number and/or locations of acoustic sensors 170 may be different from what is shown in FIG. 1. For example, the number of acoustic sensors 170 may be increased to increase the amount of audio information collected and the sensitivity and/or accuracy of the information. The acoustic detection locations may be oriented such that the acoustic sensors 170 are able to detect sounds in a wide range of directions surrounding the user wearing the headset 100.

The audio controller 150 processes information from the acoustic sensors 170 that describes detected sounds. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. Moreover, the audio controller 150 may generate and/or update audio content provided to the speakers 160, e.g., based on audio content to be presented, or based on sounds detected by the acoustic sensors 170.

The position sensor 190 generates one or more measurement signals in response to motion of the headset 100. The position sensor 190 may be located on a portion of the front rigid body 115 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof. Additional details regarding the components of the headset 100 are discussed below in connection with FIG. 4.

Figure 1B:
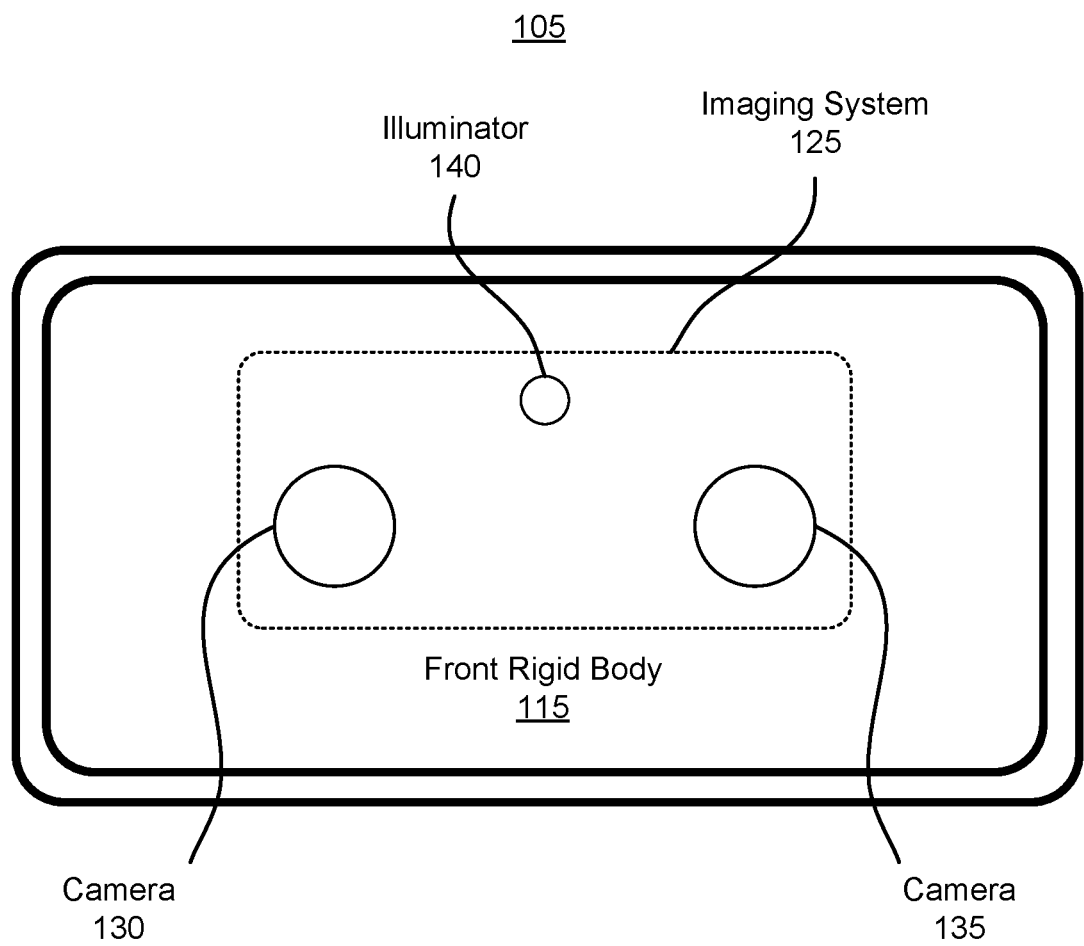
FIG. 1B is a frontal view of a portion of the headset of FIG. 1.

FIG. 1B is a frontal view 105 of a portion of the headset 100. The front view 105 of FIG. 1B illustrates the imaging system 125 comprising the cameras 130 and 135 and the illuminator 140. As mentioned above, the cameras 130 and 135 have overlapping fields of view and are oriented substantially forwards, i.e., out of the plane of the paper in the frontal view 105. In one or more embodiments, the cameras 130 and 135 are monochrome cameras with at least one camera having clusters of color filters sparsely arranged over the camera sensor. The imaging system 125 uses image data captured by the cameras 130 and 135 to generate augmented reality content of a local area. In other embodiments, one of the cameras 130 and 135 is monochrome with the other camera as color. In the embodiment with both cameras 130 and 135 as monochrome, the cameras 130 and 135 are configured to capture images including pixels in a broadband channel and other pixels in a color channel, e.g., a red light channel, a green light channel, a blue light channel, etc. The color filters will be further described in FIG. 2.

Figure 2:
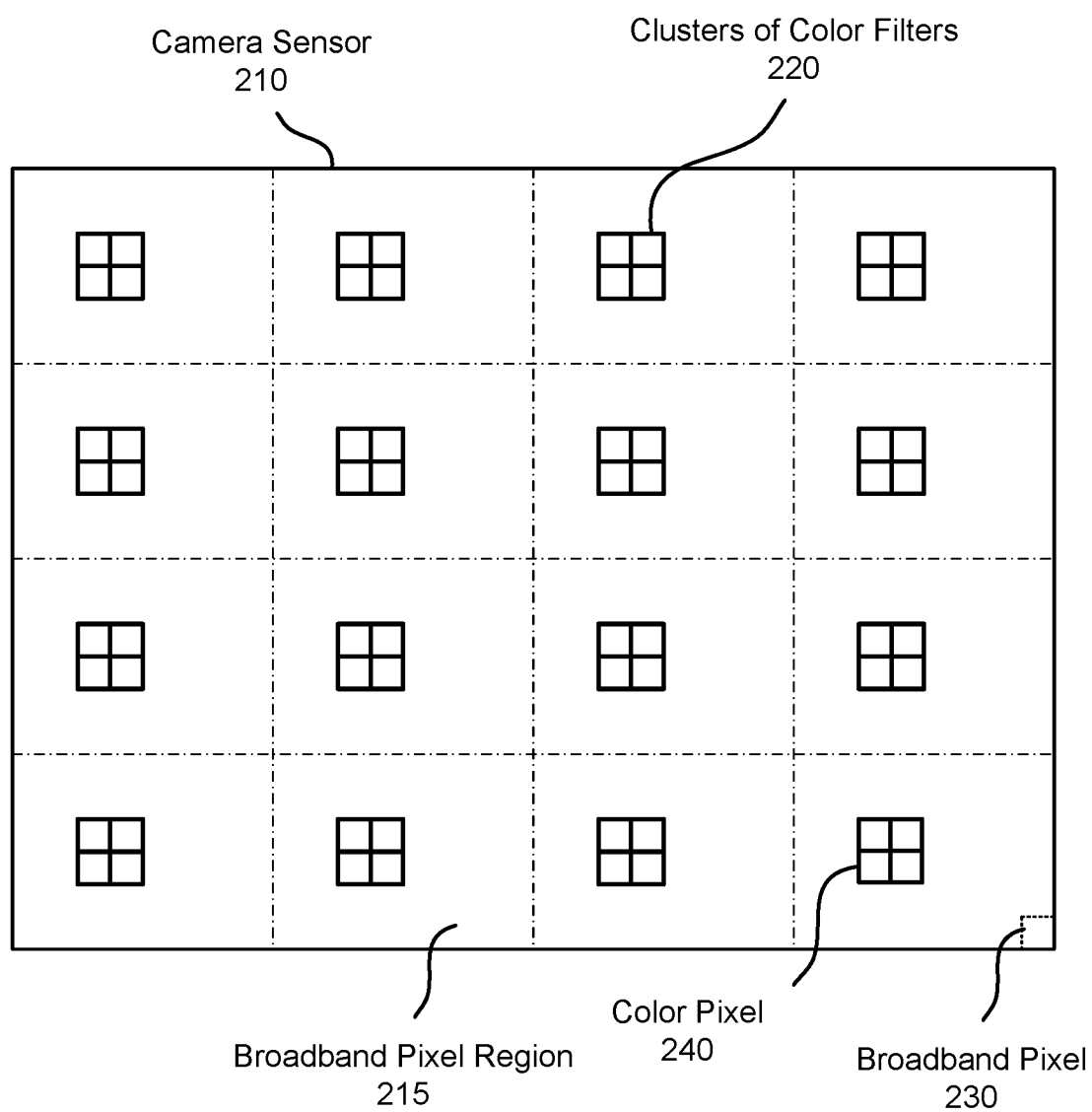
FIG. 2 is a close-up view of a camera sensor, in accordance with one or more embodiments.

FIG. 2 is a close-up view 200 of a portion of a camera sensor 210, in accordance with one or more embodiments. The close-up view 200 shows the camera sensor 210 and clusters of color filters 220 that may be used in one or both of the cameras 130 and 135. The close-up view 200 shows a broadband pixel region 215 that includes an array of broadband pixels (one of which is shown as broadband pixel 230). Some of the broadband pixels in the broadband pixel region 215 are covered with 16 clusters of color filters sparsely arranged over the broadband pixel region 215. Other embodiments include any other combinations of numbers of clusters of color filters. Note, the cameras 130 and 135 (not shown) may further include other optical elements, e.g., one or more lenses, one or more mirrors, one or more filters, other types of optical elements, etc.

The camera sensor 210 is configured to detect monochrome light, i.e., light in a broadband channel. The camera sensor 210 is comprised of a grid of broadband pixels, wherein each broadband pixel may detect an amount of light in the broadband channel incident on the pixel and store a broadband pixel value based on the amount of light detected. As shown in the close-up view 200, a broadband pixel 230 corresponds to a broadband pixel not covered by a color filter, such that the broadband pixel 230 stores a broadband pixel value based on an amount of light in the broadband channel detected by the broadband pixel.

The clusters of color filters 220 filter light, allowing color light in one or more color channels to pass through. Each cluster of color filters comprises one or more color filters, wherein each color filter passes light in at least one color channel. Example configurations of a cluster include: RGB (red, green, blue), RGB-IR (red, green, blue, infrared) which is useful in recovering some loss in SNR with purely color filters, RCB (red, clear, blue), etc. A clear filter allows color light over a majority of the visible spectrum to pass through. Each color filter covers at least one pixel, but may also be sized to cover multiple pixels. Light detected by the broadband pixels situated beneath the color filters detect an amount of light passed through the color filters, which may then be stored as the color data. As an example, this results in a pixel situated below a blue color filter to determine an amount of blue light received at the pixel. The camera stores blue pixel values with the light detected by that pixel. As shown in the close-up view 200, a color pixel 240 corresponds to a broadband pixel covered by a color filter, such that the color pixel 240 stores a color pixel value based on an amount of light in the color channel corresponding to the color filter detected by the broadband pixel. Also shown are clusters that are all identical in number of color filters (four) and arrangement of color filters (square).

The color filters in the various clusters may vary in number and coloration. For example, a cluster may comprise at least two color filters with one color filter in a first color channel and another color filter in a second color channel different from the first color channel. As another example building off the above example, the cluster further includes a third color filter in a third color channel different from the first and the second color channel. In one implementation, each cluster is a Bayer filter comprising at least one red color filter, two green color filters, and one blue color filter. Clusters may also be identical or different to other clusters, e.g., according to number of color filters, type of color filters, arrangement of color filters. As an example of similar clusters, two clusters each have at least one color filter in a first color channel. As an example of dissimilar clusters, a first cluster includes one or more color filters in a first color channel and a second cluster includes one or more color filters in a second color channel different from the first color channel. As another example of dissimilar clusters, a first cluster includes two color filters while a second cluster includes four color filters. In yet another example of dissimilar clusters, a first cluster may arrange its color filters in a square while a second cluster may arrange its color filters in a line.

A total number of pixels covered by color filters determines the amount of color data detected by the camera. More color data may yield better coloration of the aggregate image as described in FIG. 1A. Nonetheless, there is a tradeoff between the amount of color data and the signal-to-noise ratio. On one hand, more color data improves coloration of the aggregate image but sacrifices signal-to-noise ratio of the pixels situated beneath the color filters which could cause loss of tracking information or features in the scene. But on the other hand, less color filters and more broadband pixel data maintains high signal-to-noise ratio which is advantageous in identifying objects in the scene or determining a stereo correspondence between the stereoscopic image pair, e.g., useful in depth estimation, tracking, etc. Depending on relative priority between tracking (and/or depth estimation) and colorization, the number of pixels covered by color filters may be optimally set.

The clusters of color filters 220 are sparsely arranged over the camera sensor 210. Sparse arrangement of the clusters of color filters 220 refers to placement of the clusters to cover portions of the camera sensor 210 without having clusters adjacent to other clusters. One manner of achieving sparse arrangement partitions the camera sensor 210 and places a cluster in each partition. In the close-up view 200, the camera sensor 210 is partitioned into 16 sections, wherein a cluster of color filters is placed in each section of the camera sensor 210 covering a portion of pixels in the section. In some example implementations, a section is a 32×32 pixel section wherein there are one to four clusters. Other manners place clusters in other manners. For example, four clusters are placed towards corners of the camera sensor 210 with a fifth cluster placed in the center of the camera sensor 210. The placement of the clusters of color filters 220 is known to the camera, such that the pixel values detected by the pixels beneath the color filters are appropriately attributed to the correct color channel.

FIG. 3 is a flowchart illustrating a process 300 for generating augmented reality content, in accordance with one or more embodiments. The process 300 shown in FIG. 3 is described in the perspective of an imaging system 125 (e.g., the imaging system 125 of the headset 100) but may otherwise be performed by the headset 100 or more specifically by various components of the headset 100 (e.g., the imaging system 125 including the cameras 130 and 135, the display system, etc.). Other entities may perform some or all of the steps in FIG. 3 in other embodiments. Embodiments may include different and/or additional steps, or perform the steps in different orders. The imaging system 125 comprises at least two monochrome cameras, wherein at least a first camera has a first plurality of clusters of color filters sparsely arranged over the camera sensor.

The imaging system 125 captures 310 a first image with a first camera (e.g., one of the camera 130 and 135) and a second image with a second camera (e.g., the other of camera 130 and 135). The captured images may be captured at approximately the same time, creating a stereoscopic image pair of the local area in view of the cameras 130 and 135. The captured images comprise some broadband pixel data and some color pixel data. The color pixel data comes from broadband pixels covered by clusters of color filters. According to the sparse arrangement of the clusters of color filters, a majority of the image data comprises broadband pixel data with a sparse amount of color pixel data.

The imaging system 125 generates 320 an aggregate image combining the image captured by the first camera and the second image captured by the second camera. The imaging system 125 may determine a stereo correspondence between the first image and the second image by employing any number of stereo analyses. The aggregate image may be of a larger dimension than a single image from the stereoscopic image pair e.g., such that the aggregate image may substantially fill the electronic display of the display system. The generated aggregate image comprises broadband pixel data and color pixel data from the captured images.

The imaging system 125 adds 330 color values to the aggregate image based on the color data captured by the first camera with the first plurality of clusters of color filters. The color data comprises color pixel values corresponding to pixels covered by the color filters. The imaging system 125 may identify an object in the aggregate image and a color pixel coincident with the object. The imaging system 125 may add color values to other pixels corresponding to the object based on the identified color pixel value. The imaging system 125 may further employ other techniques in the coloration of the aggregate image, e.g., machine learning models, one or more image kernels, weighting color values with monochrome pixel values from the aggregate image, etc.

The imaging system 125 presents 340 the aggregate image with added color values on an electronic display. The electronic display may be a component of a display system, e.g., on the headset 100. The imaging system 125 may further augment the aggregate image with virtual content. The virtual content may be generated according to an executed application. The virtual content may be generated also considering depth information of one or more surfaces in the local area.

In one or more embodiments, the imaging system 125 repeats some or all of the process 300. At a subsequent point in time, the imaging system 125 captures another pair of stereoscopic images at step 310. The imaging system 125 may perform the process 300 to add additional color to the image data and present the colored image data. In one embodiment, the imaging system 125 adds color to pixels of objects with at least one color pixel coincident with the object, at a first instance of performing the process 300. The imaging system 125 adds more color pixels of other objects with at least one color pixel coincident with the other objects, at a second instance of performing the process 300. Moreover, the imaging system 125 may track the objects colored in the first instance and maintain or update coloration of the objects colored in the first instance during the second instance. The imaging system 125 may further generate a local model of the environment that stores identified objects (or other descriptors of the scene) and any color information that has been sampled that coincide with the identified objects. The local model is useful in simultaneous colorization of the scene and tracking (or depth estimation).

The imaging system 125 may perform other operations in the flowchart 300 of FIG. 3. For example, the imaging system 125 (or a imaging system 125) may utilize the images captured by the first camera and the second camera to determine depth information for one or more surfaces in the images. The imaging system 125 may use the stereo correspondence to calculate the depth information. The imaging system 125 may also use the images for tracking one or more objects in fields of view of the cameras.

Figure 4:
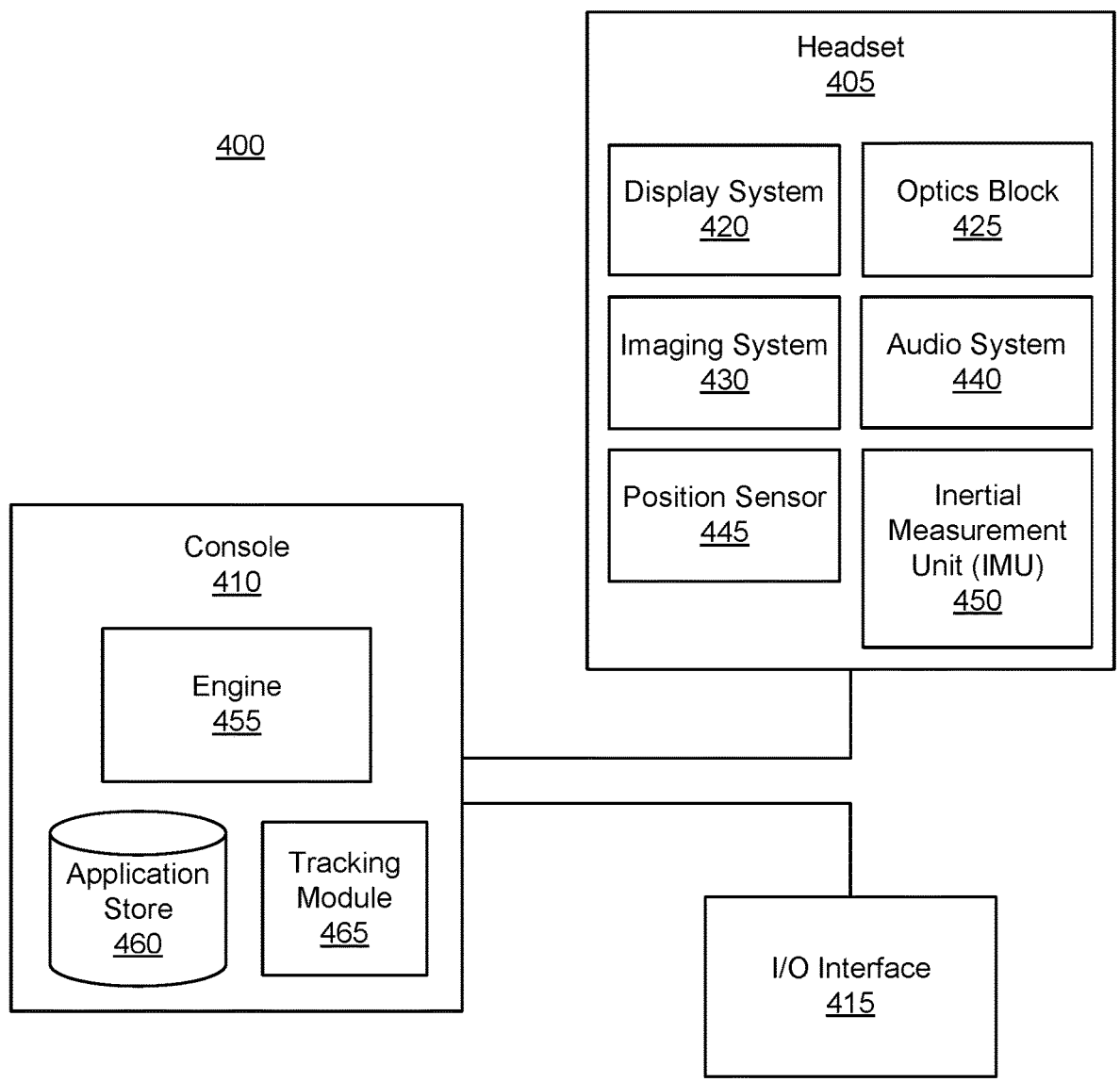
FIG. 4 is a system that includes a headset, in accordance with one or more embodiments.

FIG. 4 is a system environment of an artificial reality system 400 including a headset, in accordance with one or more embodiments. The system 400 may operate in an artificial reality context, e.g., a virtual reality, an augmented reality, a mixed reality context, or some combination thereof. The system 400 shown by FIG. 4 comprises a headset 405 and may additionally include another input/output (I/O) interface 415 that may be coupled to a console 410. The headset 100 is one embodiment of the headset 405. While FIG. 4 shows an example system 400 including one headset 405, in other embodiments, any number of additional components may be included in the system 400. In alternative configurations, different and/or additional components may be included in the system 400. Additionally, functionality described in conjunction with one or more of the components shown in FIG. 4 may be distributed among the components in a different manner than described in conjunction with FIG. 4 in some embodiments. For example, some or all of the functionality of the console 410 may be integrated into the headset 405.

The headset 405 presents content to a user. The headset 405 may be an eyewear device, a head-mounted display, an earbud, a headphone, or another type of device placed on a head. In some embodiments, the presented content includes audio content via an audio system 440, visual content via a display system 420, haptic feedback from one or more haptic feedback devices (not shown in FIG. 4), etc. In some embodiments, the headset 405 presents virtual content to the user that is based in part on depth information of a real local area surrounding the headset 405. For example, the user wearing the headset 405 may be physically in a room, and virtual walls and a virtual floor corresponding to walls and floor in the room are rendered as part of the virtual content presented by the headset 405. In another example, a virtual character or a virtual scene may be rendered as an augmentation to views of the real world through the headset 405.

The headset 405 includes a display system 420, optics block 425, an imaging system 430, an audio system 440, position sensor 445, and an inertial measurement Unit (IMU) 450. Some embodiments of the headset 405 have different components than those described in conjunction with FIG. 4. Additionally, the functionality provided by various components described in conjunction with FIG. 4 may be differently distributed among the components of the headset 405 in other embodiments, or be captured in separate assemblies remote from the headset 405. In one or more examples, the headset 405 includes an eye-tracking system, a haptic feedback system, one or more light sources (e.g., for structured illumination light), etc.

The display system 420 presents visual content to a user of the headset 405. The visual content presented may take into account depth information determined by the imaging system 430. The display system 420 may comprise an electronic display and an optics block. The electronic display displays 2D or 3D images to the user in accordance with data received from the console 410. In various embodiments, the electronic display comprises a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a waveguide display, some other display, or some combination thereof.

The optics block 425 magnifies image light received from the electronic display, corrects optical errors associated with the image light, and presents the corrected image light to a user of the headset 405. In various embodiments, the optics block 425 includes one or more optical elements. Example optical elements included in the optics block 425 include: a waveguide, an aperture, a Fresnel lens, a convex lens, a concave lens, a filter, a reflecting surface, or any other suitable optical element that affects image light. Moreover, the optics block 425 may include combinations of different optical elements. In some embodiments, one or more of the optical elements in the optics block 425 may have one or more coatings, such as partially reflective or anti-reflective coatings.

Magnification and focusing of the image light by the optics block 425 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 425 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 425 corrects the distortion when it receives image light from the electronic display generated based on the content.

The imaging system 430 captures images of a local area around the headset 405. The imaging system 430 captures images of an environment of the headset 405. The imaging system 430, as an embodiment of the imaging system 125, comprises at least two cameras, an illuminator, and a controller. Each camera comprises at least a camera sensor configured to detect light but may also include any optical element for focusing the light and such. At least one of the cameras further comprises a plurality of clusters of color filters sparsely arranged over the camera sensors. A cluster of color filters comprise one or more color filters. Each color filter filters light thereby allowing light of a color channel to pass through, e.g., to be detected by the camera sensor. The imaging system 430 captures images of the local area, wherein the captured image data comprises broadband pixel data and color pixel data captured with the color filters. The imaging system 430 generates an aggregate image combining images captured by the at least two cameras. The imaging system 430 colors the aggregate image with color data captured by the at least one camera with the sparsely arranged clusters of color filters, e.g., adding color values to the aggregate image. The colored image may be presented, e.g., via the display system 420. The imaging system 430 may further augment the colored image with other virtual content, e.g., based on an application executed by the engine 455 of the console 410.

The imaging system 430 also determines depth information of an environment around the headset 405. The depth information may include a depth map of the environment at an instant of time. The cameras of the imaging system 430 capture images of the environment with some overlapping field of view. With the captured images, the imaging system 430 can use any of numerous imaging analysis techniques to determine correspondences between the captured image which may be used for depth estimation. In other embodiments, the imaging system 430 assesses other data received by other components of the headset 405 to determine depth information, e.g., movement. For example, the headset 405 may include proximity sensors that can be also be used alone or in conjunction with the captured images to determine depth information. The depth information determined by the imaging system 430 may be used to improve content presented by the headset 405.

The audio system 440 provides audio content to a user of the headset 405. The audio system 440 may comprise one or acoustic sensors, one or more transducers, and an audio controller. The audio system 440 may provide spatialized audio content to the user. In some embodiments, the audio system 440 may request acoustic parameters from the console 410. The acoustic parameters describe one or more acoustic properties (e.g., room impulse response, a reverberation time, a reverberation level, etc.) of the local area. The audio system 440 may provide information describing at least a portion of the local area from e.g., the imaging system 430 and/or location information for the headset 405 from the position sensor 445. The audio system 440 may generate one or more sound filters using one or more of the acoustic parameters, and use the sound filters to provide audio content to the user.

The IMU 450 is an electronic device that generates data indicating a position of the headset 405 based on measurement signals received from one or more of the position sensor 445. A position sensor 445 generates one or more measurement signals in response to motion of the headset 405. Examples of position sensor 445 include: one or more accelerometers, one or more gyroscopes, one or more magnetometers, another suitable type of sensor that detects motion, a type of sensor used for error correction of the IMU 450, or some combination thereof. The position sensor 445 may be located external to the IMU 450, internal to the IMU 450, or some combination thereof.

Based on the one or more measurement signals from one or more position sensor 445, the IMU 450 generates head-tracking data indicating an estimated current position of the headset 405 relative to an initial position of the headset 405. For example, the position sensor 445 include multiple accelerometers to measure translational motion (forward/back, up/down, left/right) and multiple gyroscopes to measure rotational motion (e.g., pitch, yaw, and roll). In some embodiments, the IMU 450 rapidly samples the measurement signals and calculates the estimated current position of the headset 405 from the sampled data. For example, the IMU 450 integrates the measurement signals received from the accelerometers over time to estimate a velocity vector and integrates the velocity vector over time to determine an estimated current position of a reference point on the headset 405. Alternatively, the IMU 450 provides the sampled measurement signals to the console 410, which interprets the head-tracking data to reduce error. The reference point is a point that may be used to describe the position of the headset 405. The reference point may generally be defined as a point in space or a position related to the headset's 505 orientation and position.

The console 410 provides content to the headset 405 for processing in accordance with information received from the headset 405. In the example shown in FIG. 4, the console 410 includes an application store 460, a tracking module 465, and an engine 455. Some embodiments of the console 410 have different modules or components than those described in conjunction with FIG. 4. Similarly, the functions further described below may be distributed among components of the console 410 in a different manner than described in conjunction with FIG. 4.

The application store 460 stores one or more applications for execution by the console 410. An application is a group of instructions that, when executed by a processor, generates content for presentation to the user. Content generated by an application may be in response to inputs received from the user via movement of the headset 405 or any input/output devices. Examples of applications include: gaming applications, conferencing applications, video playback applications, or other suitable applications.

The tracking module 465 calibrates the system environment using one or more calibration parameters and may adjust one or more calibration parameters to reduce error in determination of the position of the headset 405. Calibration performed by the tracking module 465 also accounts for information received from the IMU 450 in the headset 405.

Additionally, if tracking of the headset 405 is lost, the tracking module 465 may re-calibrate some or all of the system environment.

The tracking module 465 tracks movements of the headset 405 as head-tracking data using information from the one or more position sensor 445, the IMU 450, or some combination thereof. For example, the tracking module 465 determines a position of a reference point of the headset 405 in a mapping of a local area based on information from the headset 405. Additionally, in some embodiments, the tracking module 465 may use portions of information to predict a future position of the headset 405. The tracking module 465 provides the head-tracking data inclusive of the estimated and/or predicted future position of the headset 405 to the engine 455.

The engine 455 also executes applications within the system environment and receives depth information from the imaging system 430, position information, acceleration information, velocity information, predicted future positions, or some combination thereof, of the headset 405 from the tracking module 465. Based on the received information, the engine 455 determines content to provide to the headset 405 for presentation to the user. For example, if the received information indicates that the user has looked to the left, the engine 455 generates content for the headset 405 that mirrors the user's movement in a virtual environment or in an environment augmenting the local area with additional content. Additionally, the engine 455 performs an action within an application executing on the console 410, in response to any inputs received from headset 405, and provides feedback to the user that the action was performed. The provided feedback may be visual via the headset 405. In response, the engine 455 may perform one or more of the actions in the command and/or generate subsequent content to be provided to the headset 405 based on the commands.

The I/O interface 415 is a device that allows a user to send action requests and receive responses from the console 410. An action request is a request to perform a particular action. For example, an action request may be an instruction to start or end capture of image or video data, or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 410 includes an IMU that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An imaging system comprising:
a first camera comprising:
 a first grid of broadband pixels configured to detect light in a broadband channel, and
 a first plurality of clusters of color filters, wherein each cluster of the first plurality of clusters includes at least one color filter, and the first plurality of clusters is sparsely arranged over the first grid of pixels such that a first subset of the first grid of broadband pixels are covered by the first plurality of clusters of color filters and a second subset of the first grid of broadband pixels are not covered by any color filters;

a second camera comprising:
a second grid of broadband pixels configured to detect light in a broadband channel; and
a controller configured to:
generate an aggregate image combining a first image captured by the first camera and a second image captured by the second camera,
add color values to the aggregate image based on color data captured by the first camera with the first plurality of clusters of color filters, and
present the aggregate image with added color values on an electronic display.

2. The imaging system of claim 1, wherein the first plurality of clusters of color filters includes a first cluster of color filters that is a Bayer filter.

3. The imaging system of claim 1, wherein each cluster of color filters includes a first color filter in a first color channel and a second color filter in a second color channel that is different from the first color channel.

4. The imaging system of claim 3, wherein each cluster of color filters further includes a third color filter in a third color channel that is different from the first color channel and the second color channel.

5. The imaging system of claim 1, wherein a first cluster includes a first color filter in a first color channel and a second cluster includes a second color filter in the first color channel.

6. The imaging system of claim 1, wherein a first cluster includes a first color filter in a first color channel and a second cluster includes a second color filter in a second color channel that is different than the first color channel.

7. The imaging system of claim 1, wherein each color filter covers at least one pixel in the grid of broadband pixels.

8. The imaging system of claim 1, wherein sparsely arranged indicates that the first grid is subdivided into a plurality of subsections, wherein each subsection includes at least one cluster covering one or more pixels of the corresponding subsection.

9. The imaging system of claim 1, wherein the second camera further comprises a second plurality of clusters of color filters, wherein each cluster of the second plurality of clusters includes at least one color filter, and the second plurality of clusters is sparsely arranged over the second grid of pixels, and wherein adding color values to the aggregate image is further based on color data captured by the second camera with the second plurality of clusters of color filters.

10. The imaging system of claim 1, wherein the controller is further configured to track one or more objects in relation to the imaging system with the first image captured by the first camera and the second image captured by the second camera.

11. The imaging system of claim 1 wherein the controller is further configured to determine depth information for one or more surfaces in an aggregate field of view of the first image and the second image with the first image and the second image.

12. The imaging system of claim 1, wherein the controller is further configured to:
determine a stereo correspondence between the first image and the second image,
wherein the aggregate image is generated according to the stereo correspondence.

13. The imaging system of claim 1, wherein the controller is further configured to:
identify an object in the aggregate image;
identify a first pixel with a detected color value from the color data captured by the first camera that is coincident with the object in the aggregate image; and
add color values to one or more pixels corresponding to the object based on the first pixel with the detected color value.

14. The imaging system of claim 1, wherein the imaging system and the electronic display are implemented in a head-mounted display.

15. A method comprising:
generating an aggregate image combining a first image captured by a first camera and a second image captured by a second camera, wherein the aggregate image comprises color pixel data corresponding to pixels covered by a first plurality of clusters of color filters and broadband pixel data corresponding to pixels not covered by any color filters;
adding color values to the broadband pixel data in the aggregate image based on the color pixel data captured by the first camera with the first plurality of clusters of color filters; and
presenting the aggregate image with added color values on an electronic display.

16. The method of claim 15, further comprising:
tracking one or more objects with the first image captured by the first camera and the second image captured by the second camera.

17. The method of claim 15, further comprising:
determining depth information for one or more surfaces in an aggregate field of view of the first image and the second image with the first image and the second image.

18. The method of claim 15, further comprising:
determining a stereo correspondence between the first image and the second image,
wherein the aggregate image is generated according to the stereo correspondence.

19. The method of claim 15, wherein adding color values to the broadband pixel data in the aggregate image based on the color pixel data captured by the first camera with the first plurality of clusters of color filters comprises:
identifying an object in the aggregate image;
identifying a first pixel with a detected color value from the color pixel data captured by the first camera that is coincident with the object in the aggregate image; and
adding color values to one or more pixels corresponding to the object based on the first pixel with the detected color value.

20. A non-transitory computer-readable storage medium storing instructions that, when executed by a processor, cause the processor to perform operations comprising:
generating an aggregate image combining a first image captured by a first camera and a second image captured by a second camera, wherein the aggregate image comprises color pixel data corresponding to pixels covered by a first plurality of clusters of color filters and broadband pixel data corresponding to pixels not covered by any color filters;
adding color values to the broadband pixel data in the aggregate image based on the color pixel data captured by the first camera with the first plurality of clusters of color filters; and
presenting the aggregate image with added color values on an electronic display.

* * * * *